(12) United States Patent
Kleppner et al.

(10) Patent No.: US 7,303,378 B2
(45) Date of Patent: Dec. 4, 2007

(54) APPARATUS FOR DELIVERING FUEL FROM A TANK TO AN INTERNAL COMBUSTION ENGINE

(75) Inventors: Stephan Kleppner, Bretten (DE); Hans-Peter Braun, Renfrizhausen (DE); Wolfgang Gabauer, Asperg (DE); Oliver Wahl, Schwieberdingen (DE); Thomas Wieland, Stuttgart (DE); Erich Eiler, Sersheim (DE); Ludger Kuermann, Moeglingen (DE); Juergen Weikert, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 592 days.

(21) Appl. No.: 10/821,907

(22) Filed: Apr. 12, 2004

(65) Prior Publication Data

US 2004/0219029 A1  Nov. 4, 2004

(30) Foreign Application Priority Data

May 2, 2003 (DE) .............................. 103 19 660

(51) Int. Cl.
F04B 23/08 (2006.01)
(52) U.S. Cl. ........................................ 417/87; 123/510
(58) Field of Classification Search .................. 417/77, 417/87
See application file for complete search history.

(56) References Cited

U.S. PATENT DOCUMENTS

| | | | | |
|---|---|---|---|---|
| 5,289,810 A | * | 3/1994 | Bauer et al. ................. 123/510 |
| 5,392,750 A | * | 2/1995 | Laue et al. ................... 123/509 |
| 5,642,718 A | * | 7/1997 | Nakai et al. ................. 123/497 |
| 5,743,239 A | * | 4/1998 | Iwase .......................... 123/514 |
| 5,791,317 A | * | 8/1998 | Eck ............................. 123/510 |
| 6,113,354 A | * | 9/2000 | Meese et al. ............. 417/199.1 |
| 6,123,511 A | * | 9/2000 | Sertier ......................... 417/87 |
| 6,293,256 B1 | * | 9/2001 | Kleppner et al. ........... 123/509 |
| 6,457,945 B2 | * | 10/2002 | Kleppner et al. ............. 417/84 |
| 6,532,941 B2 | * | 3/2003 | Begley et al. ............... 123/497 |
| 6,607,005 B2 | * | 8/2003 | Viebahn et al. ............. 137/574 |
| 6,698,475 B2 | * | 3/2004 | Schaefer et al. ............ 141/325 |
| 6,810,908 B2 | * | 11/2004 | Eck et al. ................ 137/565.22 |
| 6,832,602 B2 | * | 12/2004 | Tanimura .................... 123/509 |
| 7,066,153 B2 | * | 6/2006 | Vitalis et al. ............... 123/514 |
| 7,069,914 B2 | * | 7/2006 | Nagata ....................... 123/509 |
| 7,077,109 B2 | * | 7/2006 | Lee ............................. 123/514 |
| 7,080,632 B2 | * | 7/2006 | Kleppner et al. ........... 123/509 |
| 2001/0026760 A1 | * | 10/2001 | Kleppner et al. ............. 417/84 |
| 2003/0062031 A1 | * | 4/2003 | Tanimura .................... 123/510 |
| 2004/0173188 A1 | * | 9/2004 | Braun ......................... 123/509 |
| 2005/0175488 A1 | * | 8/2005 | Schelhas et al. ............ 417/505 |

FOREIGN PATENT DOCUMENTS

EP  1 300 582 A2  4/2003
FR  2 723 147 A1  2/1996

* cited by examiner

Primary Examiner—William H. Rodríguez
(74) Attorney, Agent, or Firm—Ronald E. Greigg

(57) ABSTRACT

The fuel supply apparatus according to the invention is improved in a simple manner in that it is provided with short fuel lines. According to the invention, the drive line of the suction jet pumps is connected to a pressure line downstream of the fuel supply pump and has at least one check valve or a siphon.

11 Claims, 3 Drawing Sheets

APPARATUS FOR DELIVERING FUEL FROM A TANK TO AN INTERNAL COMBUSTION ENGINE

BACKGROUND OF THE INVENTION

1. Field of the Invention

The invention is directed to an improved apparatus for delivering fuel from a tank to an internal combustion engine.

2. Description of the Prior Art

DE 42 19 516 A1 has already disclosed an apparatus for delivering fuel in which vertical suction jet pumps are connected to a common drive line. The common drive line is connected to and supplied by a return line, which leads from the internal combustion engine back to the tank and feeds excess fuel that is not needed for the combustion back into the tank. It is disadvantageous that the return line is very long, takes up a lot of space in the apparatus, and is costly.

OBJECT AND SUMMARY OF THE INVENTION

The apparatus according to the invention has the advantage over the prior art in that it is simply improved by the drive line of the at least two suction jet pumps being connected to a pressure line downstream of the fuel supply pump and having at least one check valve or siphon. Since the pressure line and the suction jet pumps are situated in close proximity to one another, the drive line leading from the pressure line to the suction jet pumps is very short, which permits a very compact design of the apparatus.

It is particularly advantageous if a pressure-regulating valve is disposed upstream of the drive line and connects the drive line to the pressure line only after a predetermined pressure is reached in the pressure line.

It is very advantageous if a first suction jet pump draws fuel from a pan region of the tank via a suction port.

It is also advantageous if a second suction jet pump draws fuel from a saddle region by means of an intake line since this conveys fuel from the saddle region into the reservoir. The second suction jet pump eliminates the need for an additional fuel pump.

It is also advantageous if the intake line of the second suction jet pump has a check valve because this prevents a suction effect from causing fuel to flow from the pan region back into the saddle region.

It is also advantageous if the first suction jet pump and the second suction jet pump are disposed vertically since this prevents the reservoir from leaking.

It is also advantageous if the drive line and/or a nozzle and/or a suction chamber of the suction jet pumps is/are provided in or on a bottom of the reservoir since this permits a very compact design of the apparatus to be achieved.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
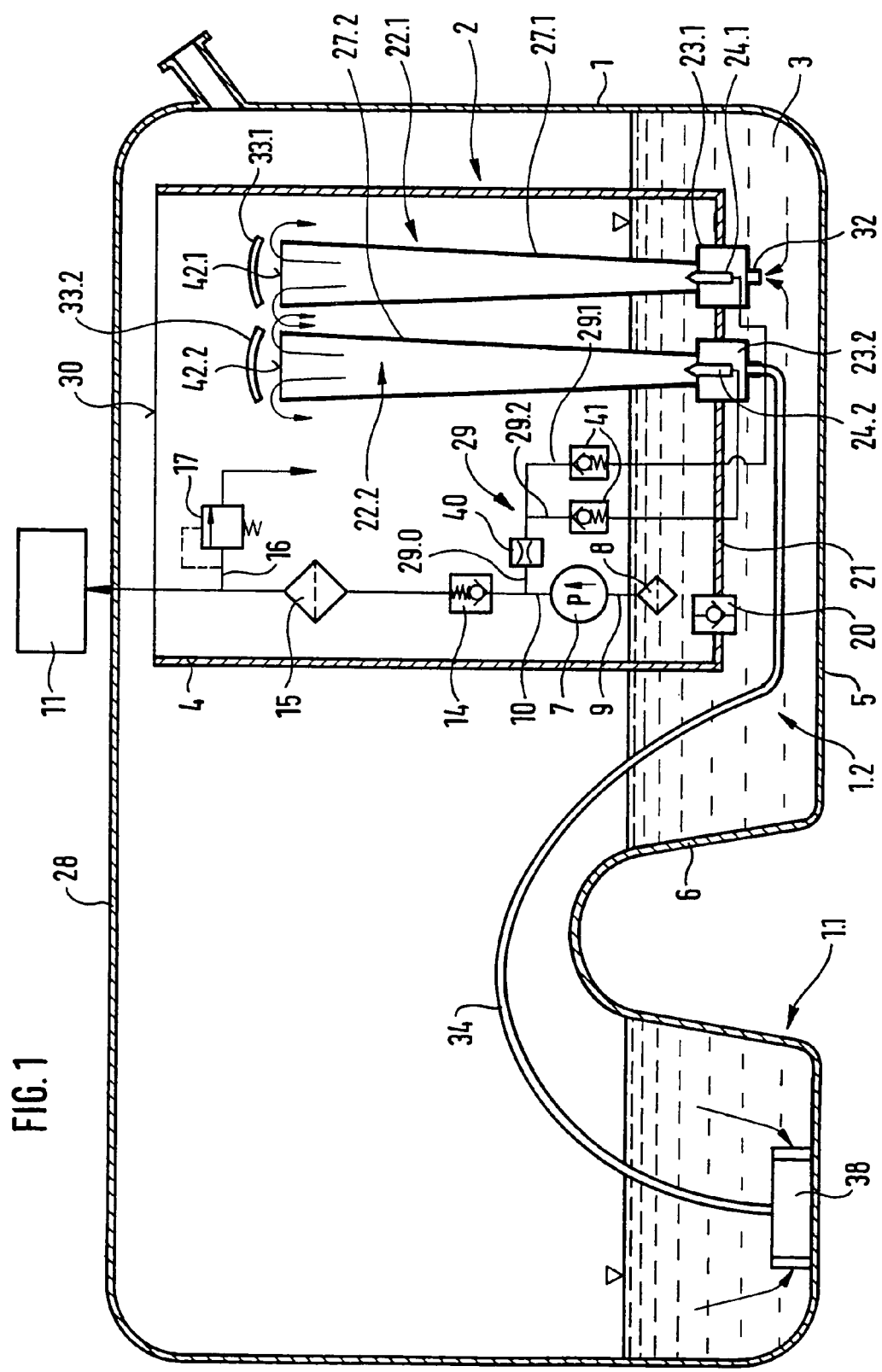
FIG. 1 shows a simplified depiction, in section, of a first exemplary embodiment of the apparatus according to the invention.

As shown in FIG. 1, apparatus according to the invention has a fuel delivery module 2 contained in a tank 1. For example, the tank 1 is used to store a fuel 3.

For example, the tank 1 is embodied in the form of a so-called saddle tank and has at least one saddle region 1.1 that is separated from a pan region 1.2 by a saddle 6. The pan region 1.2 is the region of the tank 1 that contains the fuel delivery module 2.

The fuel delivery module 2 is comprised of a reservoir 4, for example in the form of a pan, which contains a fuel supply pump 7 that draws the fuel from the reservoir 4, for example by means of a preliminary filter 8 and an intake line 9, and delivers it at an increased pressure to an internal combustion engine 11 via a pressure line 10. The reservoir 4 stores a sufficient amount of fuel to assure the fuel supply of the internal combustion engine 11 by the fuel supply pump 7, even when no fuel is being supplied into the reservoir 4, for example due to the sloshing movements of the fuel in the tank when negotiating a curve. For example, the reservoir 4 is disposed close to a tank bottom 5 of the tank 1.

For example, the fuel supply pump 7 is a flow pump that is electrically driven by an actuator, for example an armature of an electric motor.

The preliminary filter 8 protects the apparatus downstream of the preliminary filter 8 from course dirt particles contained in the fuel.

For example, the pressure line 10 contains a first check valve 14 and, downstream of the first check valve 14, a main filter 15 that filters out fine dirt particles contained in the fuel. When the fuel supply pump 7 is switched off, the first check valve 14 prevents fuel from the pressure line 10 downstream of the first check valve 14 from flowing back into the reservoir 4 via the pressure line upstream of the first check valve 14, the fuel supply pump 7, the intake line 9, and the preliminary filter 8. As a result of this, the pressure in the pressure line 10 generated by the fuel supply pump 7 is maintained for certain amount of time even when the fuel supply pump 7 is switched off.

Downstream of the main filter 15, the pressure line 10 is provided with a first branch line 16 that feeds into the reservoir 4. The first branch line 16 has a pressure-regulating valve 17. When the pressure in the pressure line 10 and therefore in the first branch line 16 exceeds a predetermined pressure, the pressure-regulating valve 17 opens and allows fuel to flow from the pressure line 10, through the first branch line 16, and into the reservoir 4. As a result, the pressure in the pressure line 10 falls back below the predetermined pressure so that the pressure-regulating valve 17 closes and does not allow any more fuel to flow into the reservoir 4 via the first branch line 16. The pressure-regulating valve 17 regulates the pressure in the pressure line 10 downstream of the first check valve 14 to a constant value.

The reservoir 4 has a first filling valve 20 that is situated, for example, in a bottom 21 of the pan-shaped reservoir 4. The first filling valve 20 opens when the level in the reservoir 4 is lower than in the tank 1 and allows fuel to flow from the tank 1 into the reservoir 4. The first filling valve 20 is embodied, for example, as an umbrella-shaped check valve that closes upon occurrence of a flow in the direction of the tank 1.

In order to prevent the fuel supply pump 7 from emptying the reservoir 4, there must be a continuous replenishing flow from the tank 1 into the reservoir 4. To that end, at least two suction jet pumps, for example a first suction jet pump 22.1 and a second suction jet pump 22.2, are provided in the reservoir 4 and feed fuel from the tank 1 into the reservoir 4.

A suction jet pump is known, for example, from DE 198 56 298 C1, the content of which is expressly intended to constitute part of the disclosure of this application.

In a known fashion, the first suction jet pump 22.1 has a first nozzle 24.1 disposed in a first suction chamber 23.1 and, downstream of the first nozzle 24.1, a first mixing tube 27.1. The first mixing tube 27.1 is embodied, for example, as a diffuser, i.e. it widens out in the flow direction and extends vertically, for example, toward a tank cover 28 of the tank 1 disposed opposite from the tank bottom 5. The first mixing tube 27.1 extends from the first suction chamber 23.1 up into the vicinity of an upper rim 30 of the reservoir 4 and, after a predetermined length of the mixing tube 27.1, finally feeds into the reservoir 4. A first deflecting element 33.1, for example, is provided at an end of the first mixing tube 27.1 oriented away from the first suction chamber 23.1 and deflects the fuel, which is emerging from the mixing tube 27.1 into the reservoir 4, toward the bottom 21 of the reservoir 4. For example, the first deflecting element 33.1 is attached to the first mixing tube 27.1, e.g. is clipped to it, molded onto it, or glued to it.

The second suction jet pump 22.2 has the same design as the first suction jet pump 22.1, with a second suction chamber 23.2, a second nozzle 24.2, a second mixing tube 27.2, and a second deflecting element 33.2.

The first suction jet pump 22.1 draws fuel from the pan region 1.2, for example, and the second suction jet pump 22.2 draws fuel from the saddle region 1.1, for example. To that end, the first suction chamber 23.1 of the first suction jet pump 22.1 is connected to the pan region 1.2 of the tank 1 directly via a suction port 32 and the second suction chamber 23.2 of the second suction jet pump 22.2 is connected to the saddle region 1.1 of the tank 1 via an intake line 34. At the end of the intake line 34 oriented toward the saddle region 1.1, an intake element 38, for example in the form of a pan, is provided, which is disposed on the tank bottom 5 of the saddle region 1.1 and filters the fuel drawn by the second suction jet pump 22.2.

According to the invention, the region of the pressure line 10 downstream of the fuel-delivery pump 7 and upstream of the first check valve 14 has a drive line segment 29.0 of a drive line 29 leading from it, which is connected via a first drive line segment 29.1 to the first nozzle 24.1 of the first suction jet pump 22.1 and is connected via a second drive line segment 29.2 to the second nozzle 24.2 of the second suction jet pump 22.2.

The drive line segment 29.0 contains a throttle 40, for example, which limits the volumetric flow passing through the drive line 29. The throttle 40 connected upstream of the first nozzle 24.1 and second nozzle 24.2 achieves a multi-stage pressure decrease so that the narrowest flow cross-section of the throttle 40, the first nozzle 24.1, and the second nozzle 24.2 can be selected to be larger than when there is a single-stage pressure decrease without a throttle 40. This allows the first nozzle 24.1 and second nozzle 24.2 to be produced at a lower cost through the use of injection molding and reduces the amount of generated flow noise.

According to the invention, at least one additional check valve 41 that closes in the direction of the fuel supply pump 7 is provided in the drive line 29; for example, one additional check valve 41 is provided in the first drive line segment 29.1 and one additional check valve 41 is provided in the second drive line segment 29.2. When the fuel supply pump 7 is switched off, these check valves prevent a leakage of fuel from the reservoir 4 into the pan region 1.2 of the tank 1 via the preliminary filter 8, the intake line 9, the fuel supply pump 7, the pressure line 10, the drive line segment 29.0, the first drive line segment 29.1, the first nozzle 24.1, the first suction chamber 23.1, and the suction port 32 or a leakage into the saddle region 1.1 of the tank 1 via the preliminary filter 8, the intake line 9, the fuel supply pump 7, the pressure line 10, the drive line segment 29.0, the second drive line segment 29.2, the second nozzle 24.2, the second suction chamber 23.2, and the intake line 34. Without the additional check valves 41 disposed in the drive line 29, the above-described undesirable leakage could occur if the level in the reservoir 4 were higher than the level in the saddle region 1.1 or the pan region 1.2 of the tank 1. The additional check valves 41 have a predetermined opening pressure that is not exceeded in the pressure line 10 upstream of the first check valve 14 when the fuel supply pump 7 is switched off, thus preventing leakage from the pressure line 10 via the drive line 29 in the direction of the first nozzle 24.1 and the second nozzle 24.2 when the fuel supply pump 7 is switched off.

The additional check valve 41 in the first drive line segment 29.1 and the second drive line segment 29.2 can also be replaced by a loop-shaped siphon respectively disposed in the first drive line segment 29.1 and the second drive line segment 29.2. One leg of the loop-shaped siphon extends vertically toward the tank cover 28 and the other leg extends back toward the bottom 21. A ventilation opening is provided, for example, at the highest point of the loop-shaped siphon.

Because the first mixing tube 27.1 and the second mixing tube 27.2 are disposed vertically, the first suction jet pump 22.1 and the second suction jet pump 22.2 are called vertical suction jet pumps. A horizontally disposed suction jet pump is called a horizontal suction jet pump.

The first suction jet pump 22.1 and the second suction jet pump 22.2 can also be embodied in a horizontal design if a check valve that closes in the direction of the tank 1 is respectively provided at the suction port 32 and in the intake line 34.

The first nozzle 24.1, the first suction chamber 23.1, the second nozzle 24.2, the second suction chamber 23.2, and the drive line 29, for example comprised of the drive line segment 29.0, the first drive line segment 29.1, and the second drive line segment 29.2, are provided, for example, in or on the bottom 21 of the reservoir 4.

During operation of the fuel supply pump 7, fuel travels via the pressure line 10 and the drive line segment 29.0 as well as via both the first drive line segment 29.1 and the second drive line segment 29.2 and is sprayed as a drive jet into the first mixing tube 27.1 and into the second mixing tube 27.2. In a known manner, as it enters the respective mixing tubes 27.1, 27.2, the drive jet entrains fuel in the flow direction so that a vacuum is generated in the respective suction chambers 23.1, 23.2, which in the first suction jet pump 22.1, draws fuel from the pan region 1.2 via the suction port 32 and in the second suction jet pump 22.2, draws fuel from the saddle region 1.1 via the intake line 34. The fuel drawn from the pan region 1.2 or from the saddle region 1.1 circulates around the respective nozzle 24.1, 24.2 in the respective suction chamber 23.1, 23.2 and, downstream of the respective nozzle 24.1, 24.2, is entrained by the drive jet emerging from the respective nozzle 24.1, 24.2.

The first suction jet pump 22.1 and the second suction jet pump 22.2 convey the fuel of the drive jet and the fuel drawn from the pan region 1.2 and saddle region 1.1 of the fuel tank 1 counter to the force of the gravity, through the respective mixing tubes 27.1, 27.2 toward the tank cover 28. At the end of the mixing tubes 27.1, 27.2 oriented toward the tank cover 28, the fuel flows over the mixing tube rims 42.1, 42.2, is deflected by the deflecting elements 33.1, 33.2, and travels into the reservoir 4. If there is fuel in the reservoir 4 above the mixing tube rim 42.1, 42.2, then when the suction jet pumps 22.1, 22.2 are not operating, this fuel can flow back into the tank 1 via the mixing tubes 27.1, 27.2 and the suction chambers 23.1, 23.2. The fuel in the reservoir 4 below the mixing tube rim 42 is stored in the reservoir 4 and is reliably prevented from escaping. The vertically extending mixing tube 27.1, 27.2 therefore has a sealing or shutoff safety function.

Figure 2:
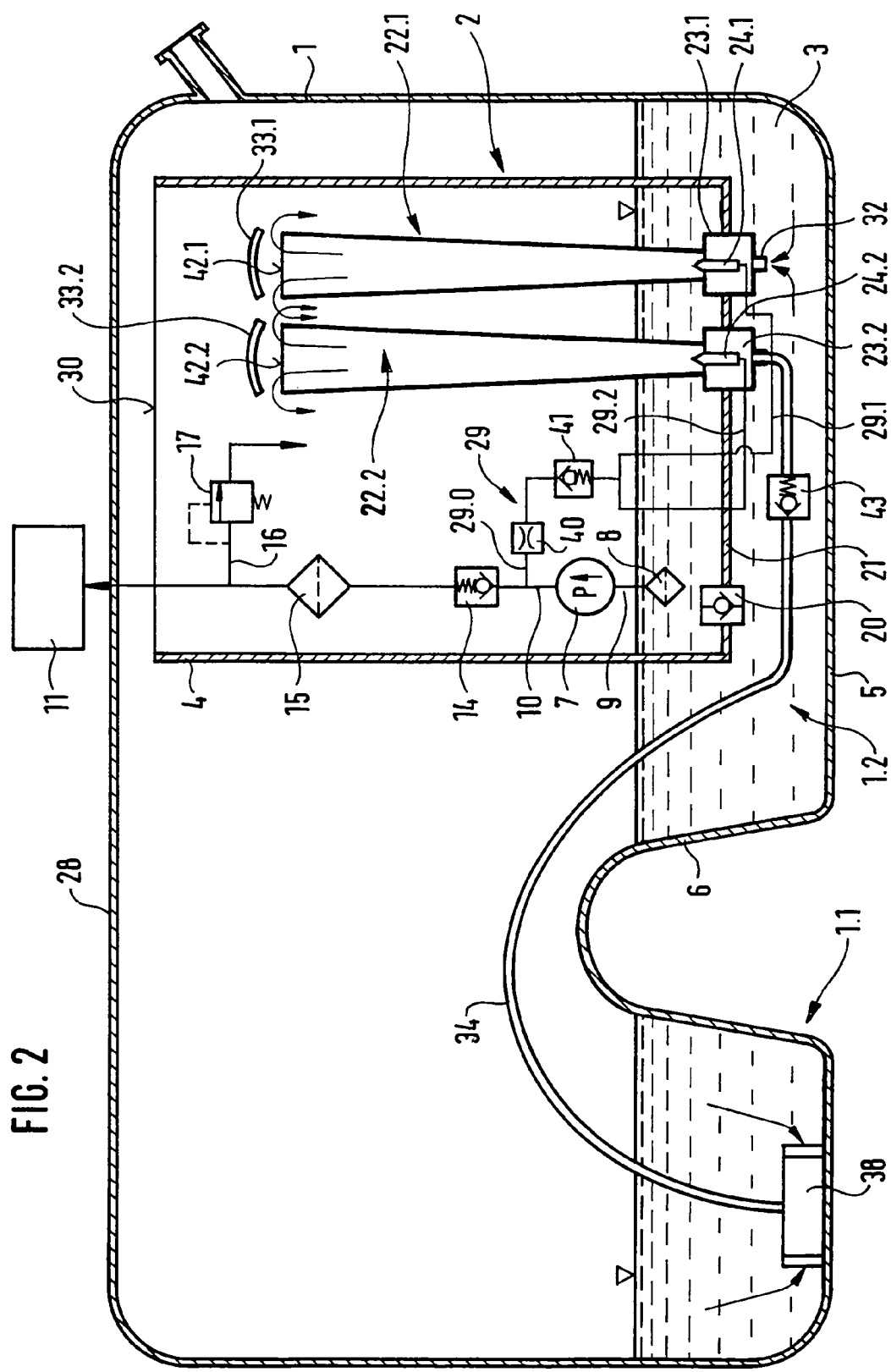
FIG. 2 shows a second exemplary embodiment.

In the embodiment of the apparatus according to FIG. 2, parts that are the same or function in the same manner as those in the apparatus according to FIG. 1 are provided with the same reference numerals.

The apparatus according to FIG. 2 differs from the apparatus according to FIG. 1 in that the additional check valve 41 is disposed in the drive line segment 29.0; i.e. no check valve is provided in the drive line segments 29.1 and 29.2.

In order to prevent a so-called short circuit between the first suction jet pump 22.1 and the second suction jet pump 22.2, in this exemplary embodiment, it is necessary to provide the intake line 34 with a suction check valve 43 that closes in the direction of the saddle region 1.1. Without the suction check valve 43 in the intake line 34, if the suction jet pumps 22.1 and 22.2 were not operating, a suction effect could cause fuel to flow from the pan region 1.2 of the tank 1 back into the saddle region 1.1 in an undesirable fashion via the suction port 32, the first suction chamber 23.1, the first nozzle 24.1, the first drive line segment 29.1, the second drive line segment 29.2, the second nozzle 24.2, the second suction chamber 23.2, and the intake line 34.

Figure 3:
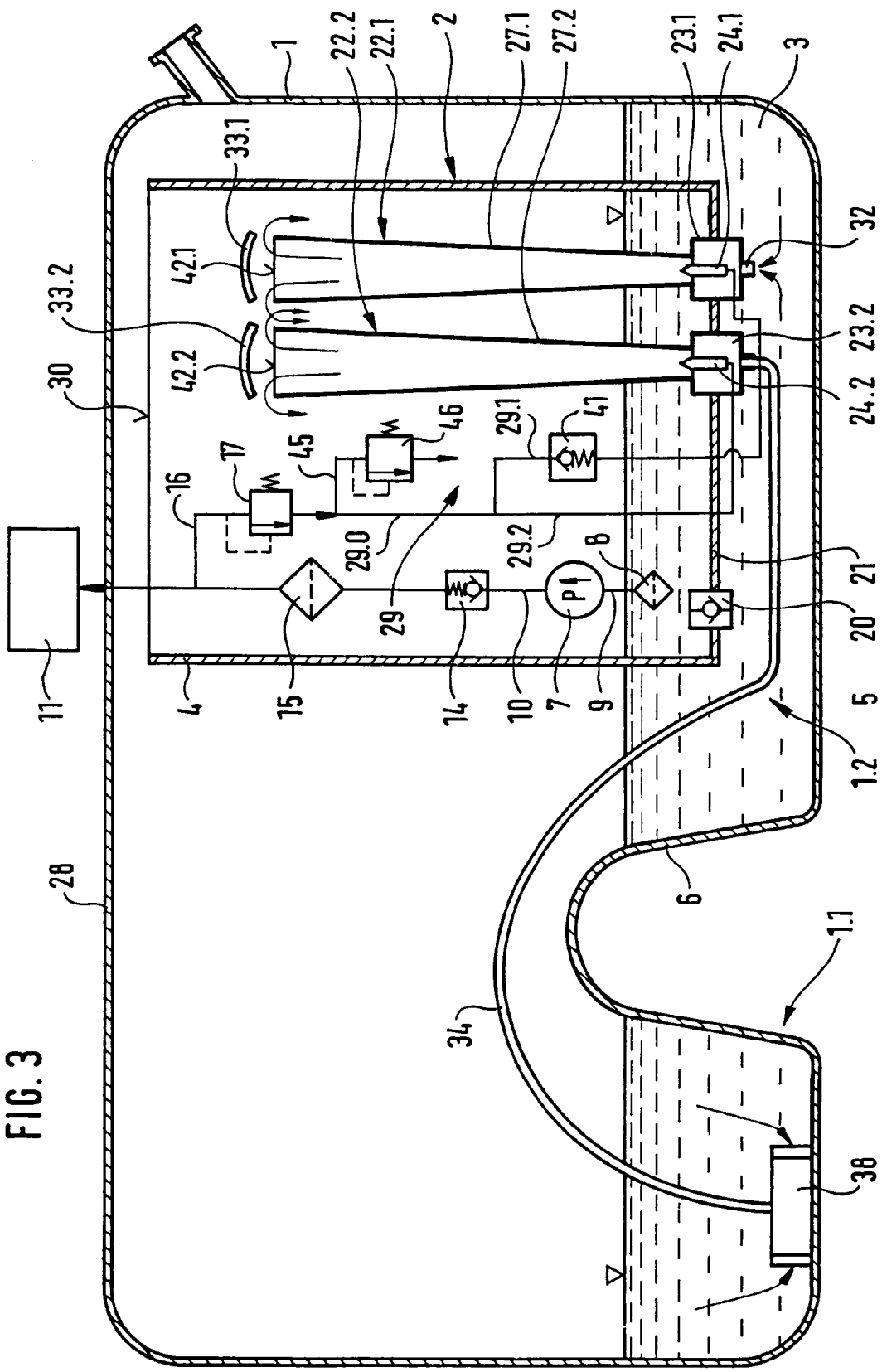
FIG. 3 shows a third exemplary embodiment.

FIG. 3 shows a third exemplary embodiment in which parts that are the same or function in the same manner as those in the apparatuses according to FIG. 1 and FIG. 2 are provided with the same reference numerals.

The apparatus according to FIG. 3 differs from the apparatus according to FIG. 1 in that the first branch line 16 does not feed into the reservoir 4, but is connected to the drive line segment 29.0 of the drive line 29 at the outlet of the pressure-regulating valve 17.

In this exemplary embodiment, the suction jet pumps 22.1, 22.2 are driven with fuel that travels from the pressure line 10 into the drive line 29 via the first branch line 16 when the pressure-regulating valve 17 is open.

The drive line segment 29.0 has, for example, a branch conduit 45 that is provided with an additional pressure-regulating valve 46. This additional pressure-regulating valve 46 opens when the pressure in the drive line segment 29.0 and therefore in the branch line 45 exceeds a predetermined value and permits fuel to flow out of the drive line segment 29.0 into the reservoir 4 via the branch conduit 45. This regulates the pressure in the drive line 29 to a constant value.

In order to prevent a so-called short circuit between the first suction jet pump 22.1 and the second suction jet pump 22.2, in this exemplary embodiment, the first drive line segment 29.1 is provided with an additional check valve 41 that opens in the direction of the first suction jet pump 22.1. Without the additional check valve 41 in the first drive line segment 29.1, if the suction jet pumps 22.1, 22.2 were not operating, a suction effect could cause fuel to flow from the pan region 1.2 of the tank 1 back into the saddle region 1.1 in an undesirable fashion via the suction port 32, the first suction chamber 23.1, the first nozzle 24.1, the first drive line segment 29.1, the second drive line segment 29.2, the second nozzle 24.2, the suction chamber 23.2, and the intake line 34.

The foregoing relates to preferred exemplary embodiments of the invention, it being understood that other variants and embodiments thereof are possible within the spirit and scope of the invention, the latter being defined by the appended claims.

We claim:

1. An apparatus for delivering fuel from a tank to an internal combustion engine of a motor vehicle, comprising
   a reservoir (4) located in the tank (1),
   a fuel supply pump (7) disposed in the reservoir (4),
   at least two suction jet pumps (22.1, 22.2) connected to a drive line (29, 29.0, 29.1, 29.2), the drive line of the suction jet pumps being connected to a pressure line (10) downstream of the fuel supply pump (7),
   at least one check valve (41) or a siphon connected in the drive line between the pressure line and the at least two suction jet pumps,
   a pressure-regulating valve (17) maintaining a constant pressure in the pressure line (10), and
   a throttle (40) in the drive line (29, 29.0) between the at least one check valve (41) or siphon and said pressure-regulating valve (17).

2. The apparatus according to claim 1, wherein the pressure-regulating valve (17) connects the drive line (29, 29.0, 29.1, 29.2) to the pressure line (10) only after a predetermined pressure is reached in the pressure line (10).

3. The apparatus according to claim 1, wherein a first suction jet pump (22.1) draws fuel via a suction port (32) from a pan region (1.2) of the tank (1), wherein the pan region contains the reservoir (4).

4. The apparatus according to claim 1, wherein a second suction jet pump (22.2) draws fuel from a saddle region (1.1) of the tank (1) by means of an intake line (34).

5. The apparatus according to claim 3, wherein a second suction jet pump (22.2) draws fuel from a saddle region (1.1) of the tank (1) by means of an intake line (34).

6. The apparatus according to claim 4, wherein the intake line (34) further comprises a suction check valve (43).

7. The apparatus according to claim 1, wherein a first suction jet pump (22.1) and second suction jet pump (22.2) are disposed vertically.

8. The apparatus according to claim 1, wherein a nozzle (24.2, 24.2) and a suction chamber (23.1, 23.2) of the section jet pumps (22.1, 22.2) are provided on a bottom (21) of the reservoir (4).

9. The apparatus according to claim 1, wherein the drive line (29) comprises a first line segment (29.1) leading to a first suction jet pump (22.1) and a second drive line segment (29.2) leading to a second suction jet pump (22.2).

10. The apparatus according to claim 9, wherein the first drive line segment (29.1) and the second drive line segment (29.2) are each provided with a respective check valve (41).

11. An apparatus for delivering fuel from a tank to an internal combustion engine of a motor vehicle, comprising
    a reservoir (4) located in the tank (1),
    a fuel supply pump (7) disposed in the reservoir (4),
    at least two suction jet pumps (22.1, 22.2) connected to a drive line (29, 29.0, 29.1, 29.2), the drive line of the suction jet pumps being connected to a pressure line (10) downstream of the fuel supply pump (7) and,
    at least one check valve (41) or a siphon connected in the pressure line, wherein a first suction jet pump (22.1) draws fuel via a suction port (32) from a pan region (1.2) of the tank (1) containing the reservoir (4), wherein a second suction jet pump (22.2) draws fuel from a saddle region (1.1) of the tank (1) by means of an intake line (34), wherein the drive line (29) comprises a first line segment (29.1) leading to the first suction jet pump (22.1) and a second drive line segment (29.2) leading to the second suction jet pump (22.2), and wherein said at least one check valve or siphon is provided in one of the first drive line segment (29.1) or the intake line (34) in a manner so as to prevent a reverse flow from the pan side 1.2 to the saddle side 1.2 via the suction let pumps 22.1, 22.2 and the intake line 34 after shutting off the fuel pump.

* * * * *